(12) United States Patent
Isomäki et al.

(10) Patent No.: US 11,310,352 B2
(45) Date of Patent: Apr. 19, 2022

(54) JOINT USE OF ETHERNET HEADER COMPRESSION AND ROBUST HEADER COMPRESSION

(71) Applicant: Nokia Technologies Oy, Espoo (FI)

(72) Inventors: Markus Isomäki, Espoo (FI); Deepa M. R., Bangalore (IN); Dawid Koziol, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/022,162

(22) Filed: Sep. 16, 2020

(65) Prior Publication Data
US 2021/0099555 A1   Apr. 1, 2021

(30) Foreign Application Priority Data
Sep. 27, 2019 (IN) .............. 201941039186

(51) Int. Cl.
  *H04L 29/06*   (2006.01)
  *H04L 69/22*   (2022.01)
  *H04L 69/16*   (2022.01)
  *H04L 69/04*   (2022.01)

(52) U.S. Cl.
  CPC .............. *H04L 69/22* (2013.01); *H04L 69/04* (2013.01); *H04L 69/16* (2013.01)

(58) Field of Classification Search
None
See application file for complete search history.

(56) References Cited

U.S. PATENT DOCUMENTS

| 2013/0007296 | A1* | 1/2013 | Mukherjee | H04L 69/22 709/231 |
| 2014/0369365 | A1* | 12/2014 | Denio | H04L 69/16 370/474 |
| 2018/0287820 | A1* | 10/2018 | Mayer-Wolf | H04L 49/3009 |
| 2019/0116521 | A1* | 4/2019 | Qiao | H04W 28/06 |
| 2019/0124181 | A1* | 4/2019 | Park | H04W 74/0833 |
| 2021/0168704 | A1* | 6/2021 | Kawasaki | H04W 36/14 |

OTHER PUBLICATIONS

"Revised WID: Support of NR Industrial Internet of Things (IoT)", 3GPP TSG RAN Meeting #84, RP-191337, Agenda : 9.4.14, Nokia, Jun. 3-6, 2019, 6 pages.

(Continued)

*Primary Examiner* — James A Edwards
(74) *Attorney, Agent, or Firm* — Harrington & Smith (57) ABSTRACT

The present invention provides a method for joint use of Ethernet header compression and robust header compression. More particularly, a method, comprising performing, a first compression/decompression operation to an Ethernet header of an Ethernet packet data; determining that the Ethernet packet includes an Internet Protocol packet; identifying at least one Internet Protocol packet within the Ethernet packet data; and performing a second compression/decompression operation to an Internet Protocol header of the at least one Internet Protocol packet, wherein the second compression/decompression operation is based on an indicated at least one of a context or profile independent from that of the first compression/decompression operation, is disclosed.

18 Claims, 8 Drawing Sheets

(56) References Cited

OTHER PUBLICATIONS

Bormann, "Robust Header Compression (ROHC) over 802 networks", Draft-bormann-rohc-over-802-02, Internet-Draft, Jul. 13, 2009, pp. 1-14.

"Discussion on performing ROHC", 3GPP TSG-RAN WG2 #107, R2-1909886, Agenda : 11.7.2.3, LG Electronics Inc., Aug. 26-30, 2019, 2 pages.

"Discussion on EHC Related to Padding Removal and IP Header Compression", 3GPP TSG-RAN WG2 Meeting 106, R2-1910830, Agenda : 11.7.2.3, Huawei, Aug. 26-30, 2019, 2 pages.

"Discussion on the Parallel Compression of ROHC and EHC", 3GPP TSG-RAN WG2 Meeting #107, R2-1910001, Agenda : 11.7.2.3, Vivo, Aug. 26-30, 2019, 2 pages.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

"3rd Generation Partnership Project; Technical Specification Group Radio Access Network; Study on NR Industrial Internet of Things (IoT); (Release 16)", 3GPP TR 38.825, V16.0.0, Mar. 2019, pp. 1-33.

International Search Report and Written Opinion received for corresponding Patent Cooperation Treaty Application No. PCT/FI2020/050584, dated Dec. 11, 2020, 19 pages.

"[104#37][NR/IIoT] Ethernet Header Compression Email Discussion Report, TP", 3GPP TSG-RAN WG2 #105, R2-1902355, Agenda : 11.7.2.3, Ericsson, Feb. 25-Mar. 1, 2019, 30 pages.

"Further Discussion on the Ethernet Header Compression Solutions", 3GPP TSG-RAN WG2# 105, R2-1901417, Agenda : 11.7.2.3, Huawei, Feb. 25-Mar. 1, 2019, pp. 1-5.

"Details for Ethernet Header Compression Solution", 3GPP TSG-RAN WG2 Meeting #107, R2-1909388, Agenda : 11.7.2.3, Intel Corporation, Aug. 26-30, 2019, pp. 1-4.

"Ethernet Header Compression", 3GPP TSG-RAN WG2 Meeting #104, R2-1816765, Agenda : 11.7.2.3, Intel Corporation, Nov. 12-16, 2018, pp. 1-4.

"Ethernet Header Compression in TSC for NR-IIoT", 3GPP TSG-RAN WG2 Meeting#107, R2-1908862, Agenda : 11.7.2.3, ZTE Corporation, Aug. 26-30, 2019, 6 pages.

\* cited by examiner

JOINT USE OF ETHERNET HEADER COMPRESSION AND ROBUST HEADER COMPRESSION

RELATED APPLICATION

This application claims priority from Indian Application No.: 201941039186 filed on Sep. 27, 2019, which is hereby incorporated in its entirety.

TECHNICAL FIELD

The teachings in accordance with the exemplary embodiments of this invention relate generally to compressing communication headers and, more specifically, relate to a combined use of robust header compression and Ethernet header compression for compressing Ethernet and/or IP headers.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| 5GS | 5G system |
| DRB | Data Radio Bearer |
| EHC | Ethernet header compression |
| gNB | 5G base station |
| IEEE | Institute of Electrical and Electronics Engineers |
| IP | Internet Protocol |
| PDCP | Packet Data Convergence Protocol |
| PDU | Protocol Data Unit |
| RoHC | robust header compression |
| TSN | time sensitive networking |
| UE | user equipment |

Data communication networks may include various routers, switches, bridges, and other network devices such as a base station or user equipment, coupled to and configured to communicate data with one another. These devices may be referred to herein as "network devices" or "network nodes." The various network elements on the communication network communicate with each other using predefined protocols. These different protocols may be used to perform different aspects of the communication, such as how signals should be formed for communication between network elements.

One commonly implemented networking or Inter-networking protocol is referred to as Ethernet. The Ethernet protocol has been defined by the Institute of Electrical and Electronics Engineers (IEEE). A family of protocols (IEEE 802.3) defines Ethernet for local area networks, while another family of protocols (IEEE 802.1) defines Ethernet for use in wide area networks such as carrier networks.

Some wireless communications systems use a robust header compression (RoHC) to reduce signaling overhead for packet transmissions, such as voice or video transmissions communicated with a UE. As a result, improved methods for managing and improving compression operations are seen to be beneficial.

Example embodiments of the invention work to improve communication and compression of protocols such as for Ethernet as indicated above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of the invention, there is proposed at least a method and apparatus to perform a combined use of robust header compression and Ethernet header compression for compressing Ethernet and/or IP headers.

3GPP RAN2 WG is standardizing Ethernet header compression (EHC) for Ethernet PDU sessions as part of NR Industrial IoT WI in one proposal it is indicated:

---

3. The detailed objectives for NR TSC-related enhancements include:

( . . . )

Specify Ethernet header compression based on structure-aware algorithm [RAN2].
        Ethernet header compression solution for LTE to be specified once the design principle for NR is agreed. The impacted LTE specifications to be added latest at RAN#85.

---

The decision has been in RAN2 not to base EHC on Robust Header Compression (RoHC) that is used to compress IP and transport protocol layer headers for IP PDU sessions, but to develop a new framework, which is expected to reuse at least some of the RoHC principles, potentially in a simplified form.

EHC is most useful for time sensitive Ethernet communication with small payload sizes. That type of traffic is currently not typically using IP on top of Ethernet, but industrial Ethernet application protocols such as Profinet and Ethercat. However, end-to-end IP communication is likely to become more widely used also for time sensitive applications (industrial control, virtual reality, . . . ) while in some of those cases the latency and reliability guarantees are still provisioned on the Ethernet level, through mechanisms such as TSN, which is also supported by the 3GPP standards.

Thus, it is likely that in some time sensitive networking deployments IP packets are carried over Ethernet over 5G Ethernet PDU sessions or IP packets are carried over Ethernet over 5G IP PDU session. In both cases it would be useful to be able to compress also the IP and UDP/IP headers in addition to just the Ethernet header. 3GPP TR 38.825 version 16.0.0, which summarizes the study phase of 3GPP RAN WGs work on Industrial IoT enhancements summarizes this aspect in the following way:

---

6.6.2.3 Relation to IP header compression

Ethernet may transport IP or non-IP traffic. This aspect is mentioned in e.g. R2-1817572 ([13]). IP header compression may be considered when Ethernet header compression is employed, in which case both independent/separate header compression solutions can be envisaged as well as a joint/integrated header compression of Ethernet and IP. Given the complexities inherent in a joint compression scheme, and the benefits of a modular approach, the developed structure-aware Ethernet header compression scheme should not consider IP header compression within a joint solution.

---

The joint operation of the algorithm to compress both IP and Ethernet was seen as complex and hence a solution allowing for compressing both Ethernet and IP headers, but with separate algorithms is preferred. This can be achieved by utilizing EHC and RoHC on top of each other, which is, however, linked with some challenges.

The practical problem is how to compress IP/Ethernet and UDP/IP/Ethernet header structures in the most efficient and standards compliant way, given the approach taken by 3GPP RAN2 for Ethernet Header Compression (EHC) and the existing RoHC compression framework. There are in principle three approaches:

1. Define additional profile(s) for EHC that can compress upper layer headers in addition to just Ethernet.
   The issue with this approach is that EHC is deliberately defined to be as simple as possible to be able to deal with the very static Ethernet headers, and is not going to be easily extensible to more complex and dynamic IP and transport layer headers. This approach was also seen as complex during the study phase on NR IIoT as mentioned above;
2. Define additional RoHC profiles combining Ethernet headers with the existing IP and transport layer profiles;
   This would be technically the most feasible approach but was rejected in 3GPP RAN2; and
3. Define how EHC and RoHC can be used within the same IP or Ethernet PDU session in such a way that EHC compresses the Ethernet header while RoHC compresses the upper layer headers with any of its profiles.
   This is the approach taken in example embodiments of the invention. It requires solving how the two compression frameworks are negotiated at the same time for a particular PDU session and how they operate and interact in a way that each of them can be as independent from the other as possible.

It is worth noting that the combination of EHC and RoHC, which means combination with an understanding about both Ethernet and IP headers, also gives an opportunity to remove Ethernet level padding from IP/Ethernet packets. In Ethernet standards the minimum frame size is 64 bytes for historic reasons. If the real payload in frame is smaller than what it takes to reach 64 bytes, padding bytes are added to the end of the payload. It would be useful to be able to remove the padding from the Ethernet frame as part of the Ethernet header compression. This requires looking into the upper layer headers, such as IP packet length, to know where the real payload ends and where the padding starts, so by default EHC cannot do this on its own. However, for the combined use of RoHC and EHC this would be a possibility. A method for doing this is included in the example embodiments of the invention.

EHC is only just under specification in 3GPP, and this problem is very specific to EHC and RoHC working together on IP/Ethernet headers over Ethernet or IP PDU sessions, In IETF, around 2009, there have been proposals about RoHC over 802 (Ethernet, Wi-Fi) networks but these address a case where RoHC is deployed at the endpoints of an Ethernet link, not in the middle of an Ethernet link such as is the case in example embodiments of the invention, where RoHC and EHC do not operate at the endpoints of an Ethernet link, but in the middle of it. Furthermore, the IETF proposals did not consider compression of Ethernet headers. The work in IETF was abandoned.

For Ethernet padding removal there have been proposals in 3GPP that the EHC decompressor should be prepared for the situation where the EHC compressor has removed padding by adding it back to the frame that would otherwise be too small There has been however no specification how the EHC compressor would be able to do this, but this has been left as a proprietary option.

Aspects of joint IP and Ethernet header compression are discussed herein as part of some RAN2 contributions at the time of this application. However, these contributions do not disclose details in accordance with embodiments of the invention as disclosed herein. For example, none of these contributions disclose any EHC and RoHC compressor/decompressor interactions and do not disclose or discuss any aspect of feedback during compression scheme establishment, which are the focus of the example embodiments of this invention.

In order to properly work together, example embodiments of the invention resolve at least four needed aspects between EHC and RoHC. These aspects include:
1. Syntax and semantics of EHC and RoHC negotiation for the same PDCP context so that the support for combined operation can be expressed unambiguously;
2. Compressor operation for data packets using EHC and RoHC compression algorithms;
3. Decompressor operation for data packets using EHC and RoHC decompression algorithms; and/or
4. Feedback messaging including combined feedback option for both EHC and RoHC In example embodiment of the invention there is presented a solution to each of these.

Figure 1:
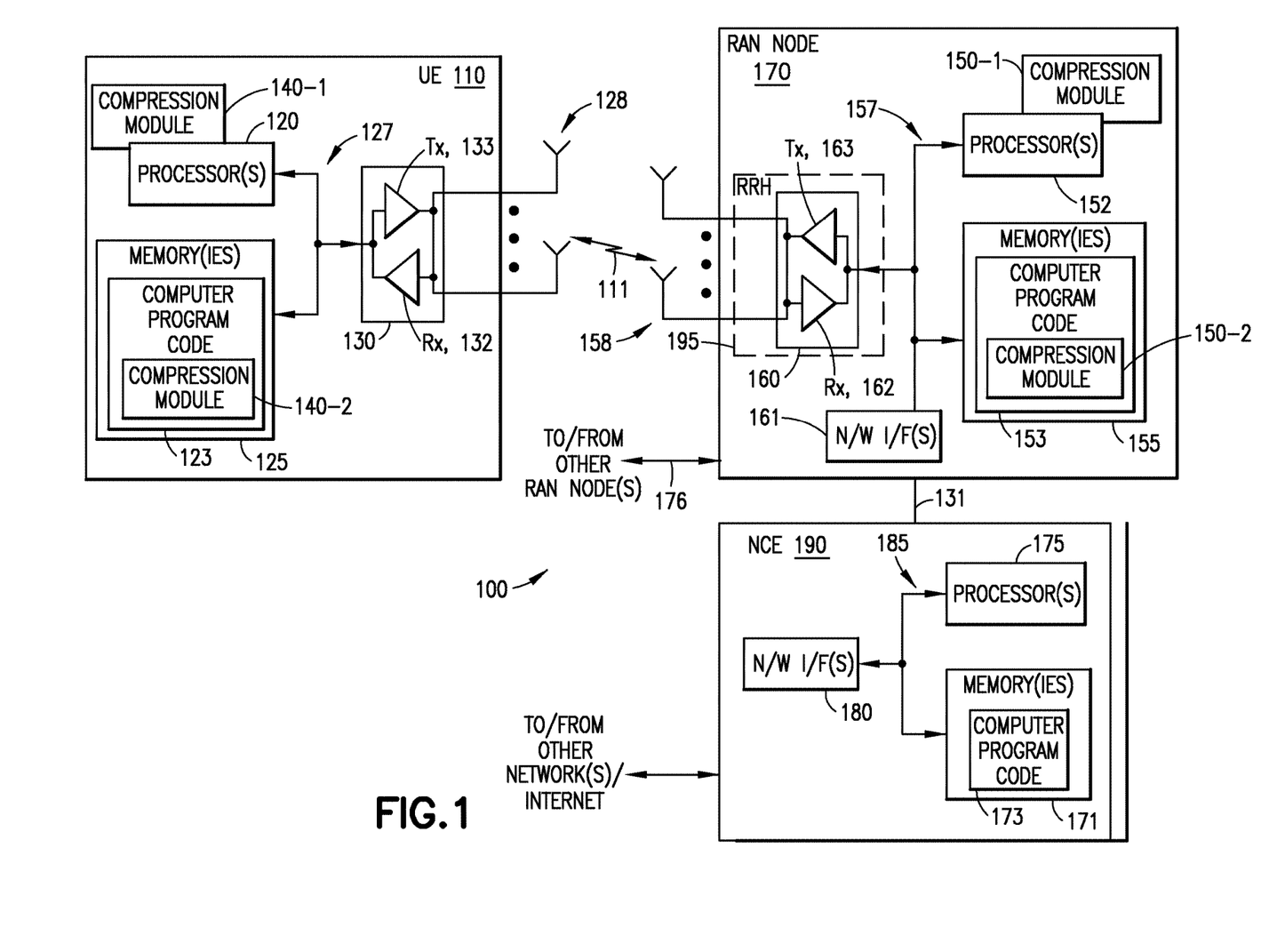
FIG. 1 shows a high level block diagram of various devices used in carrying out various aspects of the invention.

Before describing example embodiments of the invention in further detail reference is made to FIG. 1. FIG. 1 shows a high level block diagram of various devices used in carrying out various aspects of the invention.

Turning to FIG. 1, this figure shows one possible non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module, comprising one of or both parts 140-1 and/or 140-2, which may be implemented in a number of ways. The UE 110 includes processing components including a compression module(s) 140-1 and 140-2. These compression modules can include processor configurations that can be implemented to perform example embodiments of the invention as disclosed herein. The compression module may be implemented in hardware as compression module 140-1, such as being implemented as part of the one or more processors 120. The compression module 140-1 may be implemented also as an integrated circuit or through other hardware such as a programmable gate array. In another example, the compression module may be implemented as compression module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with radio access network (RAN) node 170 via a wireless link 111.

The RAN node 170 may be a base station that provides access by wireless devices such as the UE 110 to the wireless network 100. For example, the RAN node 170 may be a node (e.g. a base station) in a NR/5G network such as a gNB (a node that provides NR user plane and control protocol terminations towards the UE 110) or an ng-eNB (a node providing E-UTRA user plane and control plane protocol terminations towards the UE 110, and connected via an NG interface to the core network (i.e. 5G Core (5GC)). The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The RAN node 170 includes a compression module, comprising one of or both parts 150-1 and/or 150-2, which may be implemented in a number of ways. The compression module may be implemented in hardware as compression module 150-1, such as being implemented as part of the one or more processors 152. The compression module 150-1 may be implemented also as an integrated circuit or through other hardware such as a programmable gate array. In another example, the compression module may be implemented as compression module 150-2, which is implemented as computer program code 153 and is executed by the one or more processors 152. For instance, the one or more memories 155 and the computer program code 153 are configured, with the one or more processors 152, to cause the RAN node 170 to perform one or more of the operations as described herein. The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the RAN node 170 being physically in a different location from the RRH, and the one or more buses 157 could be implemented in part as fiber optic cable to connect the other elements of the RAN node 170 to the RRH 195.

The wireless network 100 may include a network control element or elements NCE 190 that may include core network functionality, and which provides connectivity via a link or links with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE 190, and note that both 5G and LTE functions might be supported. The RAN node 170 is coupled via a link 131 to a network control element such as the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

1. Negotiation

The RoHC negotiation logic in 3GPP currently works so that the UE provides a list of supported RoHC profiles in UE capabilities. If the base station supports these RoHC profiles, it may configure a certain set of them for a Data Radio Bearer (which can be seen as a data session at PDCP layer) and RoHC is enabled for all IP packets sent within that DRB. Even in case a packet that does not fit with any of the supported profiles (e.g. in a theoretical case where both peers supported only UDP/IP and RTP/UDP/IP profiles, but the sent packet is TCP/IP), it is sent using a special UNCOMPRESSED profile encapsulated as a RoHC packet. This means that if RoHC is enabled based on the negotiation and network configuration, all data packets are RoHC packets and there is no need to specifically identify them except for between RoHC data and RoHC feedback. The reason for special identification of RoHC feedback packets stems from the need to (give the possibility to) prioritize them already on the PDCP layer.

Similarly, if a common RoHC profile is not found between peers, RoHC is disabled (i.e. not configured by the network) and it plays no role in that session. Following this approach when RoHC is negotiated/configured together with EHC, if RoHC is enabled based on a commonly supported profile, it is known that all IP packets carried as Ethernet payload, and following the EHC packet when EHC is in use, are actually RoHC packets. Thus, there is no need to indicate on the PDCP or EHC headers specifically whether the packet is a RoHC packet (it always is when RoHC is enabled) or a plain IP packet (it always is when RoHC is disabled). One special case is identification of the feedback packets/messages, which will be covered further below.

The support and channel parameters for RoHC for a PDCP context are negotiated by RRC according to 3GPP TS 38.331. The most important aspect of this negotiation is UE providing the list of the supported RoHC profiles to the base station. Subsequently the base station may configure any of the RoHC profiles advertised by the UE and which it also supports, to be used for compressing/decompressing packets within a certain Data Radio Bearer (DRB) (after a compression context has been properly setup).

EHC negotiation has not been defined by 3GPP as of yet, but we can assume it to follow the same pattern. UE provides its capability to support EHC, and the EHC profiles they support. Initially only a single may be defined in the standards, so it is not certain if profile negotiation in EHC will be included at all, but at least the UE capability to support EHC will have to be indicated.

One new aspect is how to negotiate combined use of RoHC and EHC.

If a UE advertises support for both EHC (with specific profiles) and RoHC (with specific profiles) for an Ethernet PDU session it means it supports the combined use of EHC and RoHC for that particular PDU session. As long as all advertised EHC profiles only operate on Ethernet headers and all announced RoHC profiles operate on IP or other headers directly on top of Ethernet, any EHC or RoHC profile can be used together. However, if in the future EHC will define profiles that operate also on headers above Ethernet or RoHC will define profiles that will operate on Ethernet headers, the announcement means combined support only for any of the profiles that do not cross between the layers.

Alternatively, the UE may need to additionally signal its capability to operate EHC and RoHC in a combined way, i.e. if the UE signals EHC support and RoHC support, but no combined operation support, then the network may configure either one of EHC or ROHC for a DRB, but not both of them at the same time. In case combined operation is indicated, then network may configure both EHC and RoHC for a single DRB.

The negotiation procedure may not be a novel part of the example embodiments of the invention. However, it is described here since it is a pre-requisite for further procedures listed below.

Option 1:

2. Compression Operation for Data Packets

This section describes how RoHC and EHC compress headers of an outgoing packet in a combined effort. A prerequisite of the combined operation is that the based on the negotiation both EHC and RoHC have been enabled for a DRB. In RoHC case this means that the peers indicated support for at least one common RoHC profile.
The following combined operation of EHC compressor and RoHC compressor is proposed:
  1. Uncompressed packet is first provided to the EHC compressor;
  2. EHC compresses the Ethernet header and checks the Ethernet payload type (Type/Ethertype);
  3. If the Ethernet payload type is IPv4 or IPv6, EHC checks the IP packet length, and in case the Ethernet payload is longer than the IP packet size, optionally removes the additional bytes (as they are in that case known to be padding). EHC then gives the IP packet (or a pointer to where the IP packet starts) to RoHC;
  4. RoHC operates on the IP packet according to the profiles supported by the other peer:
    RoHC context assignments are independent from EHC context assignments; and
  5. The resulting packet is given to the lower layers for transmission.

The resulting packet is of the following format
|EHC header|RoHC header|Payload beyond RoHC profile|Padding (optionally removed)|

Figure 2:
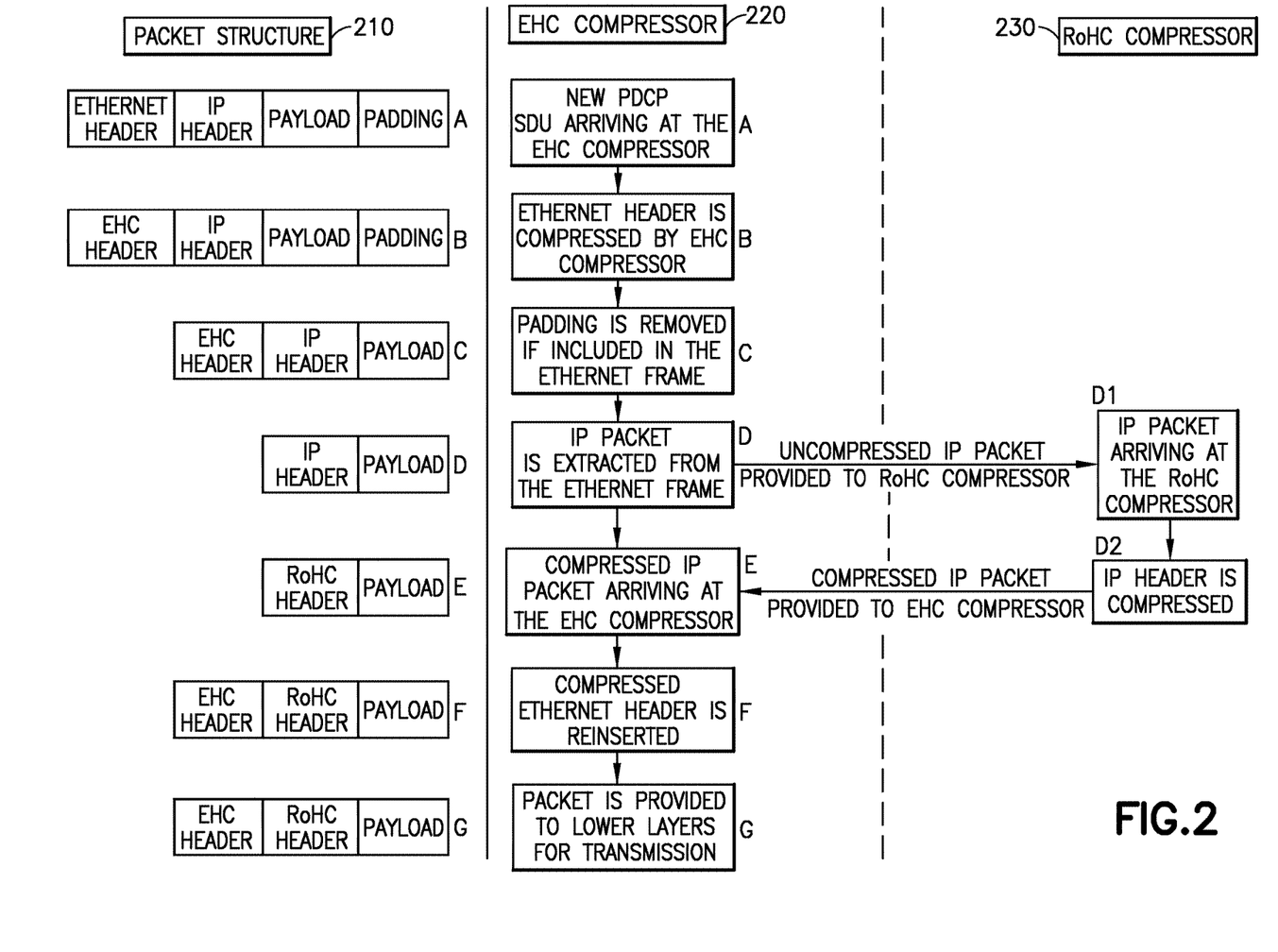
FIG. 2 shows joint operation of Ethernet header compressor and RoHC compressor for a first option in accordance with example embodiments of the invention.

FIG. 2 shows for this first option subsequent steps of compressing IP/Ethernet packet and how the EHC and RoHC compressor work together during the process. It also shows the packet structure at different stages of compression.

As shown in FIG. 2 there is a packet structure 210, an EHC compressor 220, and an ROHC compressor 230. The packet structure 210 includes packet structures A thru F. The EHC compressor 220 includes a flow of operations in accordance with example embodiments of the invention. These operations of the EHC compressor 220 flow includes that at step A there is a new PDCP SDU arriving at the EHC compressor, at step B the Ethernet header is compressed by EHC compressor, at step C padding is removed if included in the Ethernet frame, at step D if the packet is extracted from the Ethernet Frame then an uncompressed IP packet is provided to the ROHC compressor 230 and the IP packet is arriving at the ROHC compressor as shown in step D1 of the ROHC compressor 230 flow. Alternatively, EHC compressor may provide the packet together with EHC header as can be seen in step C of packet structure 210, together with a pointer to where the IP packet starts. In any case, ROHC compressor 230 is only operating on the IP packet and not on the EHC header. In ROHC compressor 230 an IP header is compressed as shown in step D2 of the ROHC compressor 230 flow, then compressed IP packet is provided to EHC compressor 220, where at step E of the EHC compressor 220 flow the compressed IP packet is arriving at the EHC compressor, at step F of the EHC compressor 220 flow the compressed Ethernet header is reinserted, then at step G of the EHC compressor 220 flow the packet is provided to lower layers for transmission. In case, in step D, the EHC compressor provided the full packet with a pointer, then at step E EHC compressor is receiving the packet with both EHC header and ROHC header, which may be directly provided to lower layers for transmission.

3. Decompression Operation for Data Packets
  1. Compressed packet is given to the EHC decompressor;
  2. EHC decompresses the Ethernet header and checks the Ethernet payload type;
  3. If Ethernet payload is IPv4 or IPv6 EHC will give the Ethernet payload (or a pointer to it) to RoHC. The payload in this case is actually a RoHC packet;
  4. RoHC operates on the packet according to the indicated context and profile, resulting in an uncompressed IP packet;
  5. After RoHC operation the packet is returned to EHC for padding addition; and/or
  6. EHC will add padding bytes if needed to make the frame reach the mandatory minimum size.

Figure 3A:
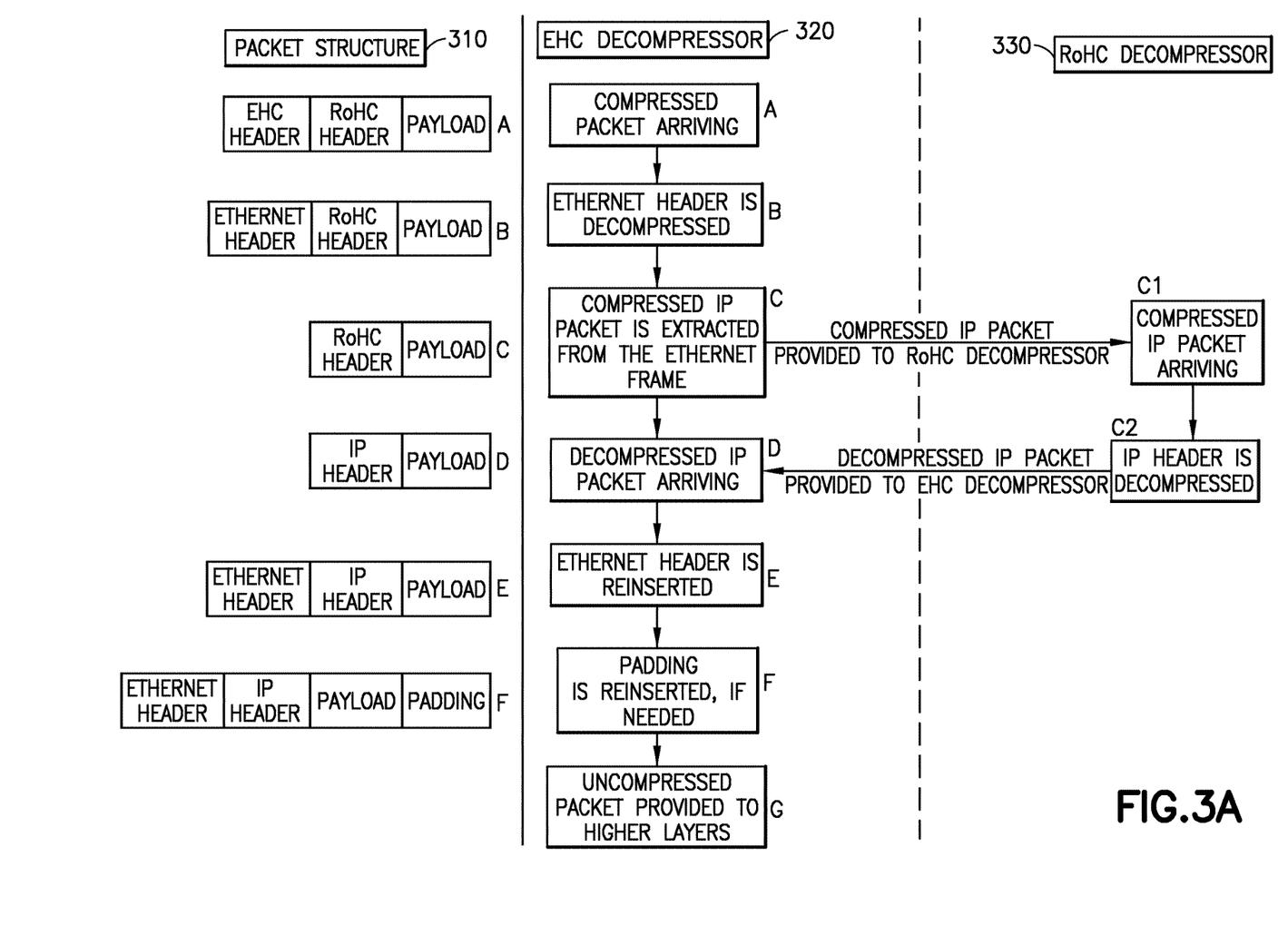
FIG. 3A shows joint operation of Ethernet header decompressor and RoHC decompressor for a first option in accordance with example embodiments of the invention.

FIG. 3A shows for this first option subsequent steps of decompressing IP/Ethernet packet and how the EHC and RoHC decompressor work together during the process. It also shows the packet structure at different stages of decompression.

As shown in FIG. 3A there is there is a packet structure 310, an EHC decompressor 320, and an ROHC decompressor 330. The packet structure 310 includes packet structures A thru F. The EHC decompressor 320 includes a flow of operations in accordance with example embodiments of the invention. These operations of the EHC decompressor 320 flow includes that at a first step there is a compressed packet arriving at the EHC decompressor, at a subsequent step the Ethernet header is decompressed, at another subsequent step compressed IP packet is extracted from the Ethernet frame and provided to the ROHC decompressor 330. Alternatively, EHC decompressor may provide the packet including decompressed Ethernet header with a pointer to where the ROHC header starts. ROHC decompressor 330 operates then on the compressed IP packet arriving at the ROHC decompressor as shown in step C1 of the ROHC decompressor 330 flow, where the IP header is decompressed as shown in C2 of the ROHC decompressor 330 flow, then decompressed IP packet is provided to EHC decompressor 320, where at step D of the EHC decompressor 320 flow the decompressed IP packet is arriving, at step E of the EHC decompressor 320 flow the Ethernet header is reinserted, at step F the padding is reinserted if needed, then at step G of the uncompressed packet is provided to higher layers. In case, in a previous step, the EHC decompressor provided the packet including Ethernet header with a pointer to where the ROHC header starts, then at step D EHC decompressor is receiving the packet with both Ethernet header and IP header, which may be directly provided to higher layers.

Option 2:
Compression Operation for Data Packets:
The following combined operation of EHC compressor and RoHC compressor is proposed:
1. Uncompressed packet is first provided to the EHC compressor;
2. EHC compresses Ethernet header and adds the EHC header.
EHC checks the Ethernet payload type (Type/Ethertype);
3. If the Ethernet payload type is IPv4 or IPv6, EHC checks the IP packet length, and in case the Ethernet payload is longer than the IP packet size, optionally removes the additional bytes (as they are in that case known to be padding). EHC compressor then gives the IP packet (or a pointer to where the IP packet starts) to RoHC;
4. RoHC operates on the IP packet according to the profiles supported by the other peer:
  RoHC context assignments are independent from EHC context assignments; and
5. The resulting packet is given to the lower layers for transmission.
|RoHC header|EHC header|Payload|Padding (optionally removed)

Figure 3B:
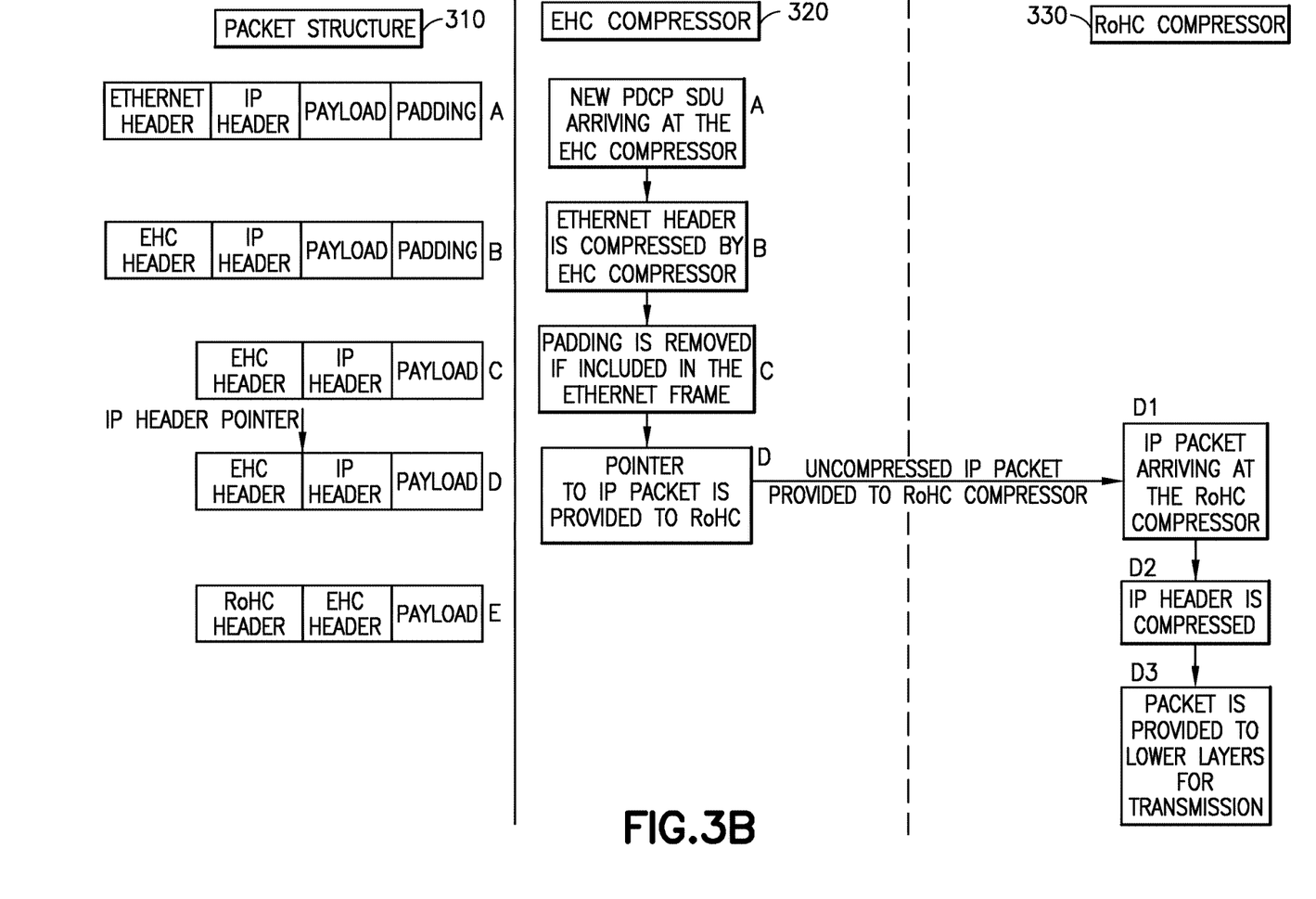
FIG. 3B shows a joint operation of Ethernet header compressor and RoHC compressor for a second option in accordance with example embodiments of the invention.

FIG. 3B shows a joint operation of EHC compressor and RoHC compressor for a second option in accordance with example embodiments of the invention.

As show in FIG. 3B similarly shows a packet structure 310, an EHC compressor 320, and an ROHC compressor 330. The packet structure 310 includes packet structures A thru E. The EHC compressor 320 includes a flow of operations in accordance with example embodiments of the invention. These operations of the EHC compressor 320 flow includes that at a first step there is a new PDCP SDU arriving at the EHC compressor 320, at a subsequent step the Ethernet header is compressed by the EHC compressor, at another subsequent step padding is removed if included in the Ethernet frame; Then a pointer to IP packet is provided to ROHC. As shown in step D1 of FIG. 3B IP packet is arriving at the ROHC compressor. At step D2 of FIG. 3B the IP header is compressed. Then as shown in step D3 of FIG. 3B the packet is provided to lower layers for transmission.

Decompression Operation for Data Packets:
1. Compressed packet is given to the RoHC decompressor along with indication if EHC is enabled or disabled;
2. RoHC operates on the packet according to the indicated context and profile, resulting in an uncompressed IP packet;
3. After RoHC operation the packet is given to EHC decompressor;
4. EHC decompresses the Ethernet header and checks the Ethernet payload type; and
5. If Ethernet payload is IPv4 or IPv6, EHC will identify and add padding bytes if needed to make the frame reach the mandatory minimum size.

Figure 3C:
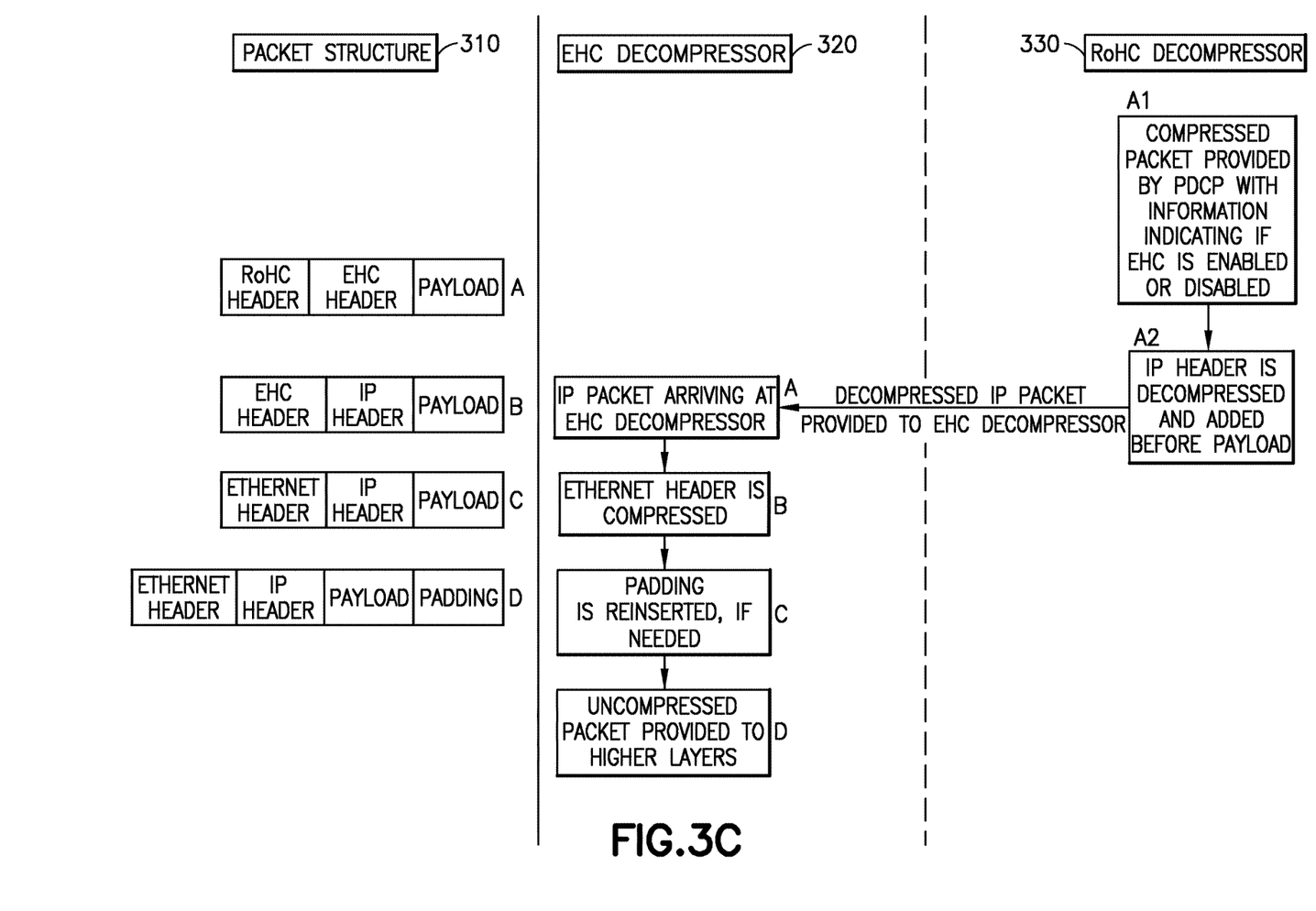
FIG. 3C shows another joint operation of Ethernet header decompressor and RoHC decompressor for a second option in accordance with example embodiments of the invention.

FIG. 3C shows a joint operation of EHC decompressor and RoHC decompressor for this second option in accordance with example embodiments of the invention;

FIG. 3C shows a packet structure 310, an EHC decompressor 320, and an ROHC decompressor 330. The packet structure 310 includes packet structures A thru F. The EHC decompressor 320 includes a flow of operations in accordance with example embodiments of the invention. These operations of the ROHC decompressor 330 flow includes that at a first step there is a compressed packet arriving at the ROHC decompressor, at a subsequent step the IP header is decompressed, at another subsequent step decompressed IP packet is provided to the EHC decompressor 320. As shown in step A1 of FIG. 3C a compressed packet is provided by PDCP with information indicating if EHC is enabled or disabled. As shown in step A2 of FIG. 3C the IP header is decompressed and added before payload. Then as shown in FIG. 3C the decompressed IP packet is provided to EHC decompressor.

4. Feedback Messages

Figure 4:
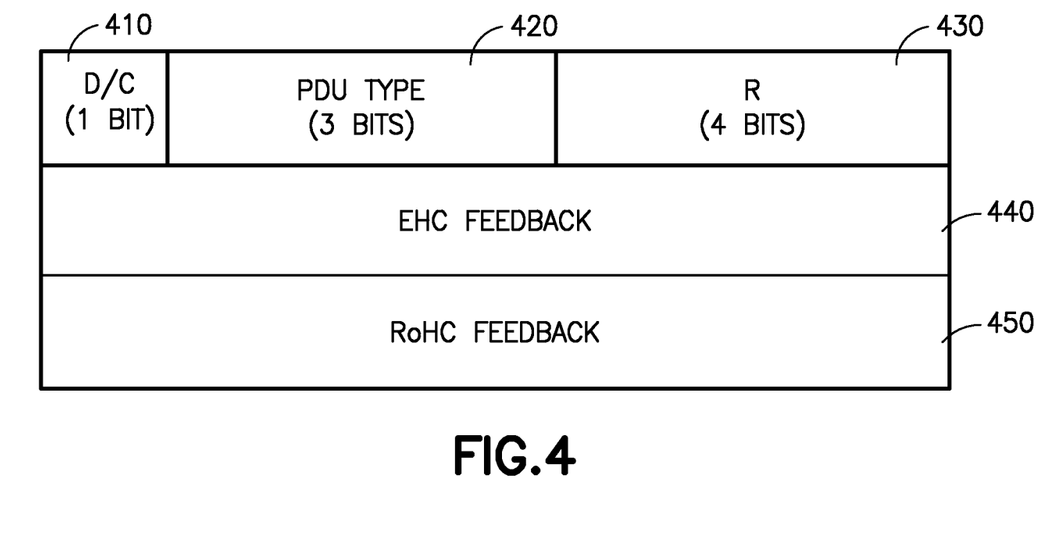
FIG. 4 shows a feedback message format in accordance with example embodiments of the invention.

Both EHC and RoHC need to send feedback messages from the decompressor to the compressor. These are distinguished by giving them a different payload identifier by PDCP. FIG. 4 shows an example of such feedback in accordance with an example embodiments of the invention.

As shown in FIG. 4 there is shown a 1 bit D/C 401, a 3 bit PDU Type 420, and a 4 bit R (reserved) 430. Wherein for FIG. 4 the:
1 bit D/C 401 is for:
0—PDCP Control PDU; or
1—PDCP Data PDU; and
3 bit PDU Type 420 is for:
000—PDCP status report;
001—Interspersed ROHC feedback;
010—EHC feedback;
011—EHC+ROHC feedback; and
100-111—Reserved Currently, PDCP PDU type distinguishes if the PDCP control PDU is interspersed RoHC feedback. This approach has originally been chosen so that special treatment (priority) can be given to feedback messages already on the PDCP layer, and it is considered important to follow this principle also when EHC and RoHC operate together. The new approach is to introduce new PDU types (e.g., '010' and '011' as shown above) to support EHC feedback and combined EHC+ROHC feedback options. Combined feedback requires that the EHC feedback is either always of fixed length or its length can be deduced from its structure, e.g. by including an explicit length header/indicator in the structure. The RoHC feedback length already has this property.

This new approach also makes it possible to combine feedback messages from multiple EHC and/or RoHC contexts within a single PDCP control PDU of type EHC+RoHC feedback.

Combining EHC and RoHC feedbacks of the Data Radio Bearer (DRB) in a single PDCP control PDU will be helpful in reducing the total number of bytes transmitted over Uu interface (i.e. between UE and gNB) since the overhead of lower layer headers added for each packet is avoided.

Figure 5A:
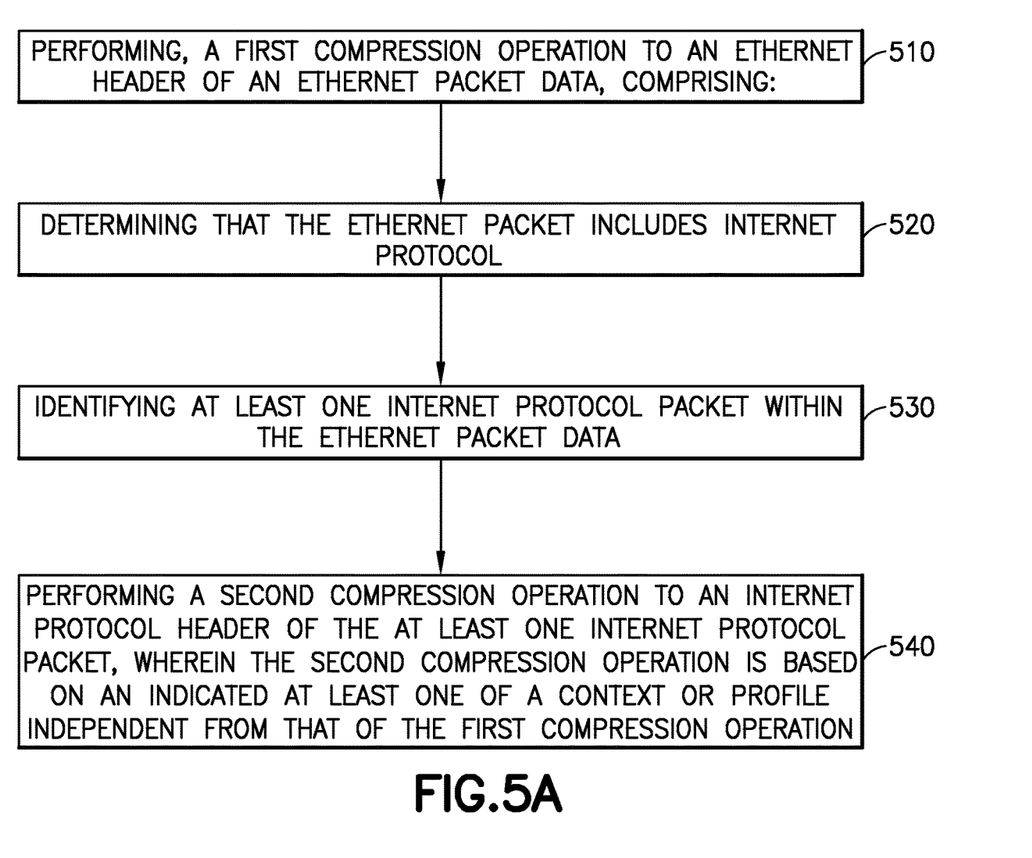
FIG. 5A and FIG. 5B each show a method in accordance with example embodiments of the invention which may be performed by an apparatus.

FIG. 5A illustrates operations which may be performed by a network device such as, but not limited to, a network node such as a RAN Node 170 for example an eNB or a UE 110 as in FIG. 1. As shown in step 510 of FIG. 5A there is performing, a first compression operation to an Ethernet header of an Ethernet packet data, comprising. As shown in step 520 of FIG. 5A there is determining that the Ethernet packet includes Internet Protocol packet. As shown in step 530 of FIG. 5A there is identifying at least one Internet Protocol packet within the Ethernet packet data. Then as shown in step 540 of FIG. 5A there is performing a second compression operation to an Internet Protocol header of the at least one Internet Protocol packet, wherein the second compression operation is based on an indicated at least one of a context or profile independent from that of the first compression operation.

In accordance with the example embodiments as described in the paragraphs above, wherein the determining that the Ethernet packet includes the Internet Protocol packet is based on Ethertype field of the Ethernet header.

In accordance with the example embodiments as described in the paragraph above, wherein the indicated at least one of a context or profile comprises a compression context or profile configured for a data communications session.

In accordance with the example embodiments as described in the paragraphs above, wherein the indicated at least one of a context or profile is based on values associated with an Ethernet header of the Ethernet packet data.

In accordance with the example embodiments as described in the paragraphs above, there is, based on an identified type of an Ethernet payload of the Ethernet packet data being one of an IPv4 or an IPv6 type payload, determining a packet length of the at least one Internet Protocol packet; and for a case that a packet length of the Ethernet packet data is longer than the packet length of the Internet Protocol packet, and there is removing Ethernet level padding bytes from the Ethernet packet data.

In accordance with the example embodiments as described in the paragraphs above, wherein the performing the first compression operation comprises providing to the second compression operation the at least one Internet Protocol packet or a pointer to a first packet of the at least one Internet Protocol packet for use by the second compression operation.

Operations in accordance with the example embodiments as described in the paragraphs above, performed by one of at least one user device or at least one base station of a communication network.

In accordance with the example embodiments as described in the paragraphs above, wherein the first compression operation comprises an Ethernet header compression operation, and wherein the second compression operation comprises a robust header compression operation.

In accordance with the example embodiments as described in the paragraphs above, there is receiving a compression feedback message in a control protocol data unit.

In accordance with the example embodiments as described in the paragraphs above, wherein the compression feedback message comprises a packet data control protocol data unit type indicating support for at least one of the first compression operation and the second compression operation.

In accordance with the example embodiments as described in the paragraphs above, wherein the packet data control protocol data unit type comprises 3 bits.

In accordance with the example embodiments as described in the paragraphs above, wherein the compression feedback message indicates Ethernet Header Compression feedback, or a combined at least one of Ethernet Header Compression feedback or Robust Header Compression feedback.

In accordance with the example embodiments as described in the paragraphs above, wherein in the combined at least one of Ethernet Header Compression or Robust Header Compression feedback, and at least one of a length header or indicator of the Ethernet Header Compression is included.

In accordance with the example embodiments as described in the paragraphs above, wherein the compression feedback message comprises feedback from a context assignment of the at least one of Ethernet Header Compression or Robust Header Compression.

In accordance with the example embodiments as described in the paragraphs above, wherein a context assignment of the Robust Header Compression is independent from a context assignment of Ethernet Header Compression.

In accordance with an example embodiment of the invention as described above there is an apparatus comprising: means for performing (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1), a first compression operation to an Ethernet header of an Ethernet packet data, comprising: means for determining (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1) that the Ethernet packet includes Internet Protocol packet; means for identifying (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1) at least one Internet Protocol packet within the Ethernet packet data; and means for performing (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1) a second compression operation to an Internet Protocol header of the at least one Internet Protocol packet, wherein the second compression operation is based on an indicated at least one of a context or profile independent from that of the first compression operation.

In the example aspect of the invention according to the paragraph above, wherein at least the means for performing, determining, and identifying comprises a non-transitory computer readable medium [memory(ies) 125, and/or memory(ies) 155 as in FIG. 1]encoded with a computer program [computer program code 123 and/or compression module 140-2, and/or computer program code 153 and/or compression module 150-2 as in FIG. 1] executable by at least one processor [processors 120 and/or compression module 140-1, and/or processors 152 and/or compression module 150-1 as in FIG. 1].

Figure 5B:
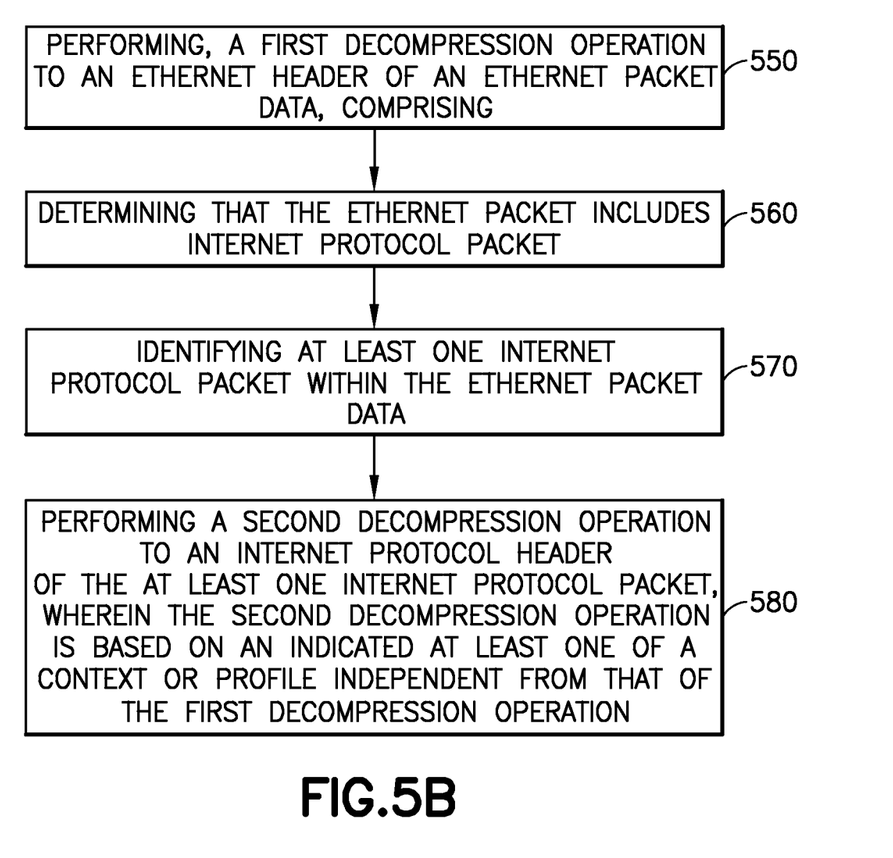

FIG. 5B illustrates operations which may be performed by a network device such as, but not limited to, a network node such as a RAN Node 170 for example an eNB or a UE 110 as in FIG. 1. As shown in step 550 of FIG. 5B there is performing, a first decompression operation to an Ethernet header of an Ethernet packet data, comprising. As shown in step 560 of FIG. 5B there is determining that the Ethernet packet includes Internet Protocol packet. As shown in step 570 of FIG. 5B there is identifying at least one Internet Protocol packet within the Ethernet packet data. Then as shown in step 580 of FIG. 5B there is performing a second decompression operation to an Internet Protocol header of the at least one Internet Protocol packet, wherein the second decompression operation is based on an indicated at least one of a context or profile independent from that of the first decompression operation.

In accordance with the example embodiments as described in the paragraphs above, wherein the determining that the Ethernet packet includes the Internet Protocol packet is based on Ethertype field of the Ethernet header.

In accordance with the example embodiments as described in the paragraph above, wherein the indicated at least one of a context or profile comprises a compression context or profile configured for a data communications session.

In accordance with the example embodiments as described in the paragraphs above, wherein the indicated at least one of a context or profile is based on values associated with an Ethernet header of the Ethernet packet data.

In accordance with the example embodiments as described in the paragraphs above, wherein the indicated at least one of a context or profile is associated with the Ethernet header of the Ethernet packet data, and wherein the Ethernet packet data comprises indicated IPv4 of IPv6 packets associated with the header of the at least on Ethernet packet.

In accordance with the example embodiments as described in the paragraphs above, wherein the performing the first decompression operation comprises providing to the second decompression operation the at least one Internet Protocol packet or a pointer to a first packet of the at least one Internet Protocol packet for use by the second decompression operation.

Operations in accordance with the example embodiments as described in the paragraphs above, performed by one of at least one user device or at least one base station of a communication network.

In accordance with the example embodiments as described in the paragraphs above, wherein the first decompression operation comprises an Ethernet header decompression operation, and wherein the second decompression operation comprises a robust header decompression operation.

In accordance with the example embodiments as described in the paragraphs above, there is communicating a compression feedback message in a control protocol data unit.

In accordance with the example embodiments as described in the paragraphs above, wherein the compression feedback message comprises a packet data control protocol data unit type indicating support for at least one of a first compression operation and a second compression operation.

In accordance with the example embodiments as described in the paragraphs above, wherein the packet data control protocol data unit type comprises 3 bits.

In accordance with the example embodiments as described in the paragraphs above, wherein the compression feedback message indicates Ethernet Header Compression feedback, or a combined at least one of Ethernet Header Compression feedback or Robust Header Compression feedback.

In accordance with the example embodiments as described in the paragraphs above, wherein in the combined at least one of Ethernet Header Compression or Robust Header Compression feedback, and at least one of a length header or indicator of the Ethernet Header Compression is included.

In accordance with the example embodiments as described in the paragraphs above, wherein the compression feedback message comprises feedback from a context assignment of the at least one of Ethernet Header Compression or Robust Header Compression.

In accordance with the example embodiments as described in the paragraphs above, wherein a context assignment of the Robust Header Compression is independent from a context assignment of Ethernet Header Compression.

In accordance with an example embodiment of the invention as described above there is an apparatus comprising: means for performing (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1), a first decompression operation to an Ethernet header of an Ethernet packet data; means for determining (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1) that the Ethernet packet includes Internet Protocol packet; means for identifying (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/or compression module 140-1, and/or processors 152 and/or compression module 150-1 as in FIG. 1) at least one Internet Protocol packet within the Ethernet packet data; and means for performing (one or more transceivers 130 and/or one or more transceivers 160; memory(ies) 125, and/or memory(ies) 155; computer program code 123 and/or compression module 140-2, and/or computer program code 153 and/or compression module 150-2; and processors 120 and/ or compression module 140-1, and/or processors 152 and/or compression module 150-1 as in FIG. 1) a second decompression operation to an Internet Protocol header of the at least one Internet Protocol packet, wherein the second decompression operation is based on an indicated at least one of a context or profile independent from that of the first decompression operation.

In the example aspect of the invention according to the paragraph above, wherein at least the means for performing, determining, and identifying comprises a non-transitory computer readable medium [memory(ies) 125, and/or memory(ies) 155 as in FIG. 1]encoded with a computer program [computer program code 123 and/or compression module 140-2, and/or computer program code 153 and/or compression module 150-2 as in FIG. 1] executable by at least one processor [processors 120 and/or compression module 140-1, and/or processors 152 and/or compression module 150-1 as in FIG. 1].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   perform, a first compression operation to an ethernet header of an ethernet packet data, comprising:
   determining that the ethernet packet includes an internet protocol packet;
   identifying at least one internet protocol packet within the ethernet packet data, wherein the determining that the ethernet packet includes the at least one internet protocol packet is based on an ethertype field of the ethernet header; and
   based on the determining, performing a second compression operation to an internet protocol header of the at least one internet protocol packet, wherein the second compression operation is based on at least one of a context or profile independent from that of the first compression operation,
   wherein based on the determining the first compression operation then gives at least one internet protocol packet or a pointer to where the at least one internet protocol packet starts to the second compression operation which operates on the at least one internet protocol packet according to the context or profile for transmission of the ethernet packet data to a peer, wherein the context or profile is supported by the peer.

2. The apparatus of claim 1, wherein the at least one of a context or profile comprises a compression context or profile configured for a data communications session.

3. The apparatus of claim 2, wherein the at least one of a context or profile is based on values associated with an ethernet header of the ethernet packet data.

4. The apparatus of claim 1, wherein the at least one memory including the computer program code is configured with the at least one processor to cause the apparatus to: based on an identified type of an ethernet payload of the ethernet packet data being one of an IPv4 or an IPv6 type payload, determine a packet length of the at least one internet protocol packet; and for a case that a packet length of the ethernet packet data is longer than the packet length of the internet protocol packet, remove ethernet level padding bytes from the ethernet packet data.

5. The apparatus of claim 1, wherein the performing the first compression operation comprises providing to the second compression operation the at least one internet protocol packet or a pointer to a first packet of the at least one internet protocol packet for use by the second compression operation.

6. The apparatus of claim 1, wherein the apparatus comprises at least one user device or at least one base station of a communication network.

7. The apparatus of claim 1, wherein the first compression operation comprises an ethernet header compression operation, and wherein the second compression operation comprises a robust header compression operation.

8. The apparatus of claim 1, wherein the at least one memory including the computer program code is configured with the at least one processor to cause the apparatus to: receive a compression feedback message in a control protocol data unit.

9. The apparatus of claim 8, wherein the compression feedback message indicates ethernet header compression feedback, or a combined ethernet header compression feedback and robust header compression feedback.

10. An apparatus comprising:
at least one processor; and
at least one memory including computer program code, where the at least one memory and the computer program code are configured, with the at least one processor, to cause the apparatus to at least:
perform, a first decompression operation to an ethernet header of an ethernet packet data, comprising:
determining that the ethernet packet includes an internet protocol packet; identifying at least one internet protocol packet within the ethernet packet data,
wherein the determining that the ethernet packet includes the at least one internet protocol packet is based on an ethertype field of the ethernet header; and
based on the determining, performing a second decompression operation to an internet protocol header of the at least one internet protocol packet, wherein the second decompression operation is based on at least one of a context or profile independent from that of the first decompression operation,
wherein based on the determining the first decompression operation gives at least one internet protocol packet or a pointer to where the at least one internet protocol packet starts to the second decompression operation which operates on the at least one internet protocol packet according to the context or profile, wherein the context or profile is supported by the apparatus.

11. The apparatus of claim 10, wherein the at least one of a context or profile comprises a compression context or profile configured for a data communications session.

12. The apparatus of claim 11, wherein the at least one of a context or profile is based on values associated with an ethernet header of the ethernet packet data.

13. The apparatus of claim 11, wherein the at least one of a context or profile is associated with the ethernet header of the ethernet packet data, and wherein the ethernet packet data comprises IPv4 of IPv6 packets associated with the header of the at least on ethernet packet.

14. The apparatus of claim 11, wherein the performing the first decompression operation comprises providing to the second decompression operation the at least one internet protocol packet or a pointer to a first packet of the at least one internet protocol packet for use by the second decompression operation.

15. The apparatus of claim 10, wherein the apparatus comprises one of at least one user device or at least one base station of a communication network.

16. The apparatus of claim 10, wherein the first decompression operation comprises an ethernet header decompression operation, and wherein the second decompression operation comprises a robust header decompression operation.

17. The apparatus of claim 10, wherein the at least one memory including the computer program code is configured with the at least one processor to cause the apparatus to: communicate a compression feedback message in a control protocol data unit.

18. The apparatus of claim 17, wherein the compression feedback message indicates ethernet header compression feedback, or a combined ethernet header compression feedback and robust header compression feedback.

\* \* \* \* \*